United States Patent
Rosemann

(10) Patent No.: US 6,530,130 B2
(45) Date of Patent: Mar. 11, 2003

(54) CLIP FOR FIXING STRIPS

(75) Inventor: Frank Rosemann, Rockenberg (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/995,502

(22) Filed: Nov. 27, 2001

(65) Prior Publication Data

US 2002/0073515 A1 Jun. 20, 2002

(30) Foreign Application Priority Data

Nov. 29, 2000 (DE) .......................................... 100 59 289

(51) Int. Cl.[7] .......................... A44B 21/00; B60R 13/02
(52) U.S. Cl. ............................ 24/297; 24/3.12; 24/503; 24/495; 24/515; 24/522; 296/97.9; 296/213
(58) Field of Search .................... 24/297, 3.12, 489, 24/493, 495, 522, 515, 563, 503; 296/97.9, 213

(56) References Cited

U.S. PATENT DOCUMENTS

| 4,557,503 A | * | 12/1985 | Linn ............................ 24/515 |
| 4,669,156 A | * | 6/1987 | Guido et al. .................... 24/297 |
| 4,750,781 A | * | 6/1988 | Betteridge ................... 296/214 |
| 5,575,527 A | * | 11/1996 | Pfister ......................... 296/213 |
| 5,640,742 A | * | 6/1997 | White et al. .................. 24/3.12 |
| 6,073,418 A | * | 6/2000 | Phillips ........................ 24/3.12 |
| 6,322,126 B1 | * | 11/2001 | Kraus ......................... 296/97.9 |

* cited by examiner

Primary Examiner—Victor Sakran
(74) Attorney, Agent, or Firm—Edward D. Murphy

(57) ABSTRACT

Clip arrangement for fixing a strip, in particular a decorative strip in a vehicle, with a retaining part (1) and a snap-on part (2), wherein the retaining part has a receiving slot (13) with an upper guide (14) and a lower guide (17), into which receiving slot (13) there projects obliquely at least one latching finger (15) having a latching opening (16) at its free end, wherein the snap-on part (2) also has at least one projection (23) with a plurality of latching lugs (24) which can latch with a latching opening (16) when the projection (23) is inserted into the receiving slot (13). Each latching finger (15) is designed and directed in such a way that it can gently yield to the latching lugs (24) when the projection (23) is inserted into the receiving slot (13), but prevents the snap-on part (2) from being withdrawn after the latching lugs (24) have been latched into latching openings (16).

1 Claim, 2 Drawing Sheets

CLIP FOR FIXING STRIPS

BACKGROUND OF THE INVENTION

The present invention relates to a clip arrangement for fixing a strip to a structure. Clip arrangements of this type are used, in particular, for fixing decorative strips, in particular decorative strips as a window surround, in vehicles.

In known arrangements, latching means are available which have a plurality of teeth arranged in series so the decorative strips can be fixed at different depths according to manufacturing tolerances and irregularities in each case. A disadvantage in these arrangements can be that the force for applying a decorative strip increases with increasing depth of fixing which can lead to damage to the strip or makes automation of the handling process difficult.

SUMMARY OF THE PRESENT INVENTION

It is an object of the present invention to provide a clip for fixing strips which is simple in construction, economical to produce and highly reliable in operation.

It is the object of the present invention to provide a clip arrangement in which the force for fixing a strip is substantially independent of the depth of fixing, but in which nevertheless great resistance to dismantling occurs. The object is achieved by a clip according to claim 1.

BRIEF DESCRIPTION OF THE ACCOMPANYING DRAWINGS

Details of the invention are described by means of a preferred embodiment, to which the invention is, however, not limited, with the aid of the drawings, in which.

DETAILED DESCRIPTION OF THE INVENTION

Figure 1:
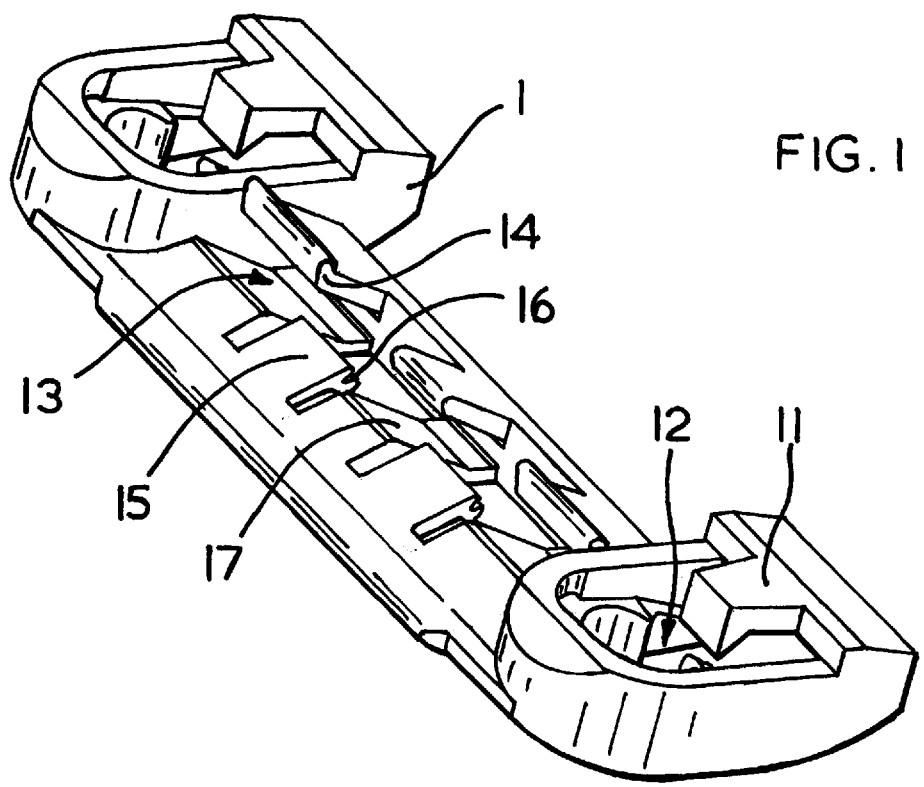
FIG. 1 is a perspective view of a retaining part according to the present invention.

FIG. 1 illustrates a retaining part 1 which can be fixed to a structure (not shown) by means of one or more retaining devices 11. Fixing is typically by means of fixing elements, for example, studs welded onto the structure and engaging in receiving openings 12 in the mountings 11. The retaining part 1 has a receiving slot which is limited by an upper guide 14 and a lower guide 17. The upper guide 14 and the lower guide 17 are preferably formed by a plurality of individual portions which are designed, in particular, in such a way that the whole part can be readily demoulded during production by injection moulding. At least one latching finger 15 directed obliquely into the receiving slot 13 and with a latching opening 16 at its free end projects somewhat into the receiving slot 13.

Figure 2:
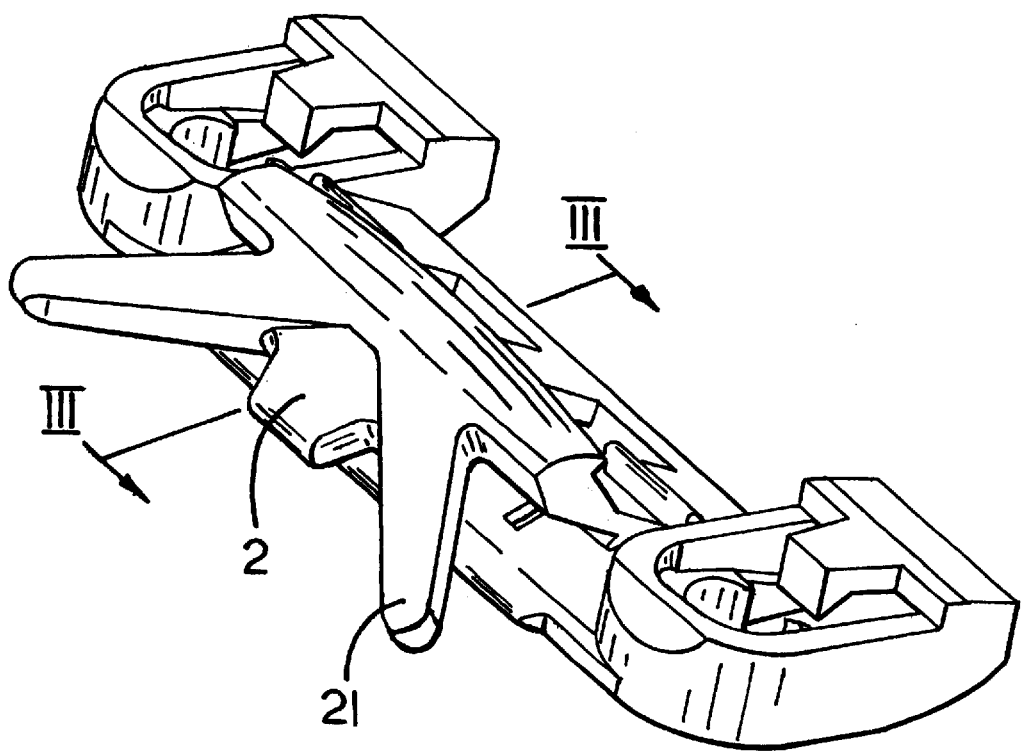
FIG. 2 shows the retaining part in FIG. 1 with an inserted snap-on part.

FIG. 2 shows the retaining part according to FIG. 2 with an inserted snap-on part 2. This snap-on part 2 is formed in such a way, for example with projecting retaining wings 21, that it can initially be fixed in a decorative strip (not shown) and is used for the later fixing of this decorative strip on the retaining part 1.

Figure 3:
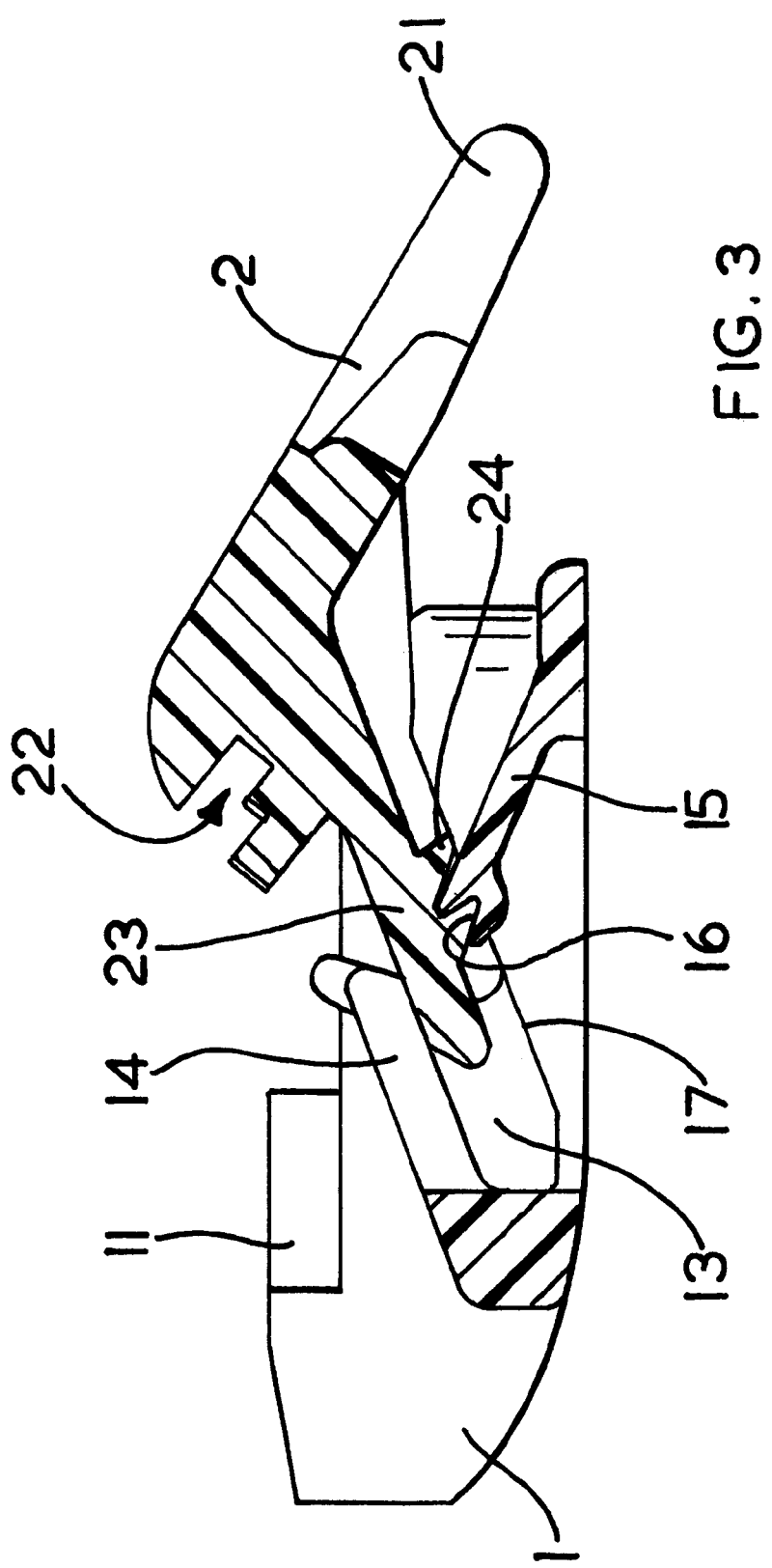
FIG. 3 is a view taken along the line III—III of FIG. 2.

For a better view of the entire arrangement, FIG. 3 illustrates the view taken along the line III—III of FIG. 2. It can be seen that a strip, not shown, can be fixed to the snap-on part 2 by means of a retaining groove 22 in cooperation with the retaining wings 21. The strip with the snap-on part is then fixed in the retaining part 1 while a projection 23 with a plurality of latching lugs 24 and projecting out of the snap-on part 2 is inserted in the receiving slot 13 until one of the latching lugs 24 latches into the latching opening 16 of a latching finger 15 in a suitable position. The upper guide 14 and the lower guide 17 guide the projection 23 very precisely into the desired position and allow no alteration of position upwards or downwards. The length and shape of the latching fingers 15 allows them to gently spring back and yield to the latching lugs 24 when the projection 23 is pushed into the receiving slot 13. The oblique position of the latching fingers 15, however, in cooperation with the barb-like structure of latching lugs 24 and latching openings 16, causes very high forces to secure the snap-on part against withdrawal. The illustrated designs of latching opening 16 and latching lug 24 are particularly advantageous, although other structures of the barbed type could also be used at these points.

The present invention has the advantage that a strip can be fixed at different depths with constant force, a great retaining force simultaneously preventing later detachment.

In general, the above identified embodiments are not to be construed as limiting the breadth of the present invention. It will be understood that modifications or other alternative constructions may become apparent within the scope of the invention as defined in the appended claims.

What is claimed is:

1. Clip arrangement for a decorative strip in a vehicle comprising:
   a. a retaining part (1);
   b. a snap-on part (2);
   c. the retaining part has a receiving slot (13) with an upper guide (14) and a lower guide (17);
   d. the receiving slot (13) has therein at least one latching finger (15) with a latching opening (16) at its free end;
   e. the snap-on part (2) has at least one projection (23) with a plurality of latching lugs (24) formed thereon to be engaged with a latching opening (16) upon the projection (23) being inserted into the receiving slot (13) for latching engagement therein;
   f. a plurality of latching fingers (15) are designed to gently yield to the latching lugs (24) upon the projection (23) being inserted into the receiving slot (13); and
   g. the latching fingers (15) prevent the snap-on part (2) from easily being withdrawn after the latching lugs (24) have been latched into latching openings (16).

* * * * *